US009366749B2

(12) United States Patent
Grokop et al.

(10) Patent No.: US 9,366,749 B2
(45) Date of Patent: Jun. 14, 2016

(54) DEVICE POSITION ESTIMATES FROM MOTION AND AMBIENT LIGHT CLASSIFIERS

(75) Inventors: Leonard Henry Grokop, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 896 days.

(21) Appl. No.: 13/348,497

(22) Filed: Jan. 11, 2012

(65) Prior Publication Data

US 2012/0265482 A1 Oct. 18, 2012

Related U.S. Application Data

(60) Provisional application No. 61/476,159, filed on Apr. 15, 2011.

(51) Int. Cl.
*G06F 15/00* (2006.01)
*G01C 19/00* (2013.01)
(Continued)

(52) U.S. Cl.
CPC ............... *G01S 5/16* (2013.01); *G01C 21/165* (2013.01); *G06F 1/1686* (2013.01); *G06F 1/1694* (2013.01); *H04M 1/72522* (2013.01); *G01C 19/34* (2013.01); *G01C 19/44* (2013.01)

(58) Field of Classification Search
CPC ............. G06K 9/00664; G06K 9/6202; G06T 7/0046; G01C 19/34; G01C 19/44; G01C 21/165; G01S 5/16; G06F 1/1686; G06F 1/1694; H04M 1/72522
USPC ............ 702/141, 150, 159; 345/156; 701/220
See application file for complete search history.

(56) References Cited

U.S. PATENT DOCUMENTS 7,522,065 B2   4/2009 Falcon
2003/0107514 A1   6/2003 Syrjarinne et al.
(Continued)

FOREIGN PATENT DOCUMENTS

CN  101321344 A   12/2008
CN  101558372 A   10/2009
(Continued)

OTHER PUBLICATIONS

International Search Report and Written Opinion—PCT/US2012/027105—ISA/EPO—Jul. 4, 2012.

*Primary Examiner* — John H Le
(74) *Attorney, Agent, or Firm* — Silicon Valley Patent Group LLP

(57) ABSTRACT

A position estimate for a mobile device is generated using data from motion sensors, such as accelerometers, magnetometers, and/or gyroscopes, and data from light sensors, such as an ambient light sensor, proximity sensor and/or camera intensity sensor. A plurality of proposed positions with associated likelihoods is generated by analyzing information from the motion sensors and a list of candidate positions is produced based on information from the light sensors. At least one of the plurality of proposed positions is eliminated using the list of candidate positions and a position estimate for the mobile device is determined based on the remaining proposed positions and associated likelihoods. The proposed positions may be generated by extracting features from the information from the motion sensors and using models to generate likelihoods for the proposed positions. The likelihoods may be filtered over time. Additionally, a confidence metric may be generated for the estimated position.

33 Claims, 3 Drawing Sheets

(51) Int. Cl.
  *G01S 5/16* (2006.01)
  *G01C 21/16* (2006.01)
  *G06F 1/16* (2006.01)
  *H04M 1/725* (2006.01)
  *G01C 19/34* (2006.01)
  *G01C 19/44* (2006.01)

(56) References Cited

U.S. PATENT DOCUMENTS

| | | |
|---|---|---|
| 2007/0075965 A1 | 4/2007 | Huppi et al. |
| 2009/0132197 A1 | 5/2009 | Rubin et al. |
| 2009/0262052 A1 | 10/2009 | Yang |
| 2010/0009643 A1 | 1/2010 | Haartsen |
| 2010/0121636 A1 | 5/2010 | Burke et al. |
| 2010/0177037 A1* | 7/2010 | Kim et al. ............ 345/156 |
| 2010/0279661 A1 | 11/2010 | Furuta et al. |
| 2011/0050428 A1 | 3/2011 | Istoc |
| 2011/0102451 A1 | 5/2011 | Broga et al. |
| 2011/0307173 A1* | 12/2011 | Riley .................. 701/220 |
| 2012/0182420 A1 | 7/2012 | Grokop et al. |

FOREIGN PATENT DOCUMENTS

| | | |
|---|---|---|
| CN | 101584124 A | 11/2009 |
| CN | 101910846 A | 12/2010 |
| CN | 101919273 A | 12/2010 |
| JP | 2009171302 A | 7/2009 |
| JP | 2009294128 A | 12/2009 |
| JP | 2011504331 A | 2/2011 |
| KR | 20100123490 A | 11/2010 |
| KR | 20110011392 A | 2/2011 |
| KR | 20110035563 A | 4/2011 |
| WO | 2009062176 A2 | 5/2009 |

* cited by examiner

DEVICE POSITION ESTIMATES FROM MOTION AND AMBIENT LIGHT CLASSIFIERS

CROSS-REFERENCE TO PROVISIONAL APPLICATION

This application claims priority under 35 USC 119 to U.S. Provisional Application No. 61/476,159, filed Apr. 15, 2011, and entitled "Fusing Device Position Estimates From Motion And Ambient Light Classifiers", which is assigned to the assignee hereof and which is incorporated herein by reference.

BACKGROUND

1. Background Field

Embodiments of the subject matter described herein are related generally to determining a position estimate for a mobile device, and more particularly to using information from two different sets of sensors to determine the position estimate.

2. Relevant Background

Most smartphone devices contain both motion sensors and light sensors that can be used to infer the position of a device with respect to the user, e.g. device is in the users hand, pants pocket, shirt pocket, backpack, purse, resting on a desk, etc. . . . Motion sensors, such as accelerometers, magnetometers, and gyroscopes, are capable of recording the movements and orientation of the device. Sensors such as the ambient light sensor, the proximity sensor, and the camera, report on the environment surrounding the device. In particular, the ambient light sensor (ALS) reports the intensity of the light (e.g., in lux) impinging on the front face of the device while the proximity sensor reports the intensity of emitted infra-red light reflecting off objects that are proximate to the front of the device. The camera is capable of recording a detailed image containing millions of colored pixels, but can also be used as a back-side light sensor, capturing only the average intensities of red, green and blue light impinging on the back face of the device.

Unfortunately, light sensors, such as ALS, proximity sensor, and camera on typical mobile devices have drawbacks. The ALS output is often heavily quantized in low-layer software such that the available output at high-layers takes on one of only a handful of intensity values (for example, it takes on only one of four values, 10, 325, 7650 and 21525 lux in some current smartphones). The proximity sensor output at high-layers is typically 0 or 1, crudely representing whether an object is proximate to the front-face of the device, or not. The camera intensity is typically subject to automatic gain control (AGC) at low-layer software, which makes it difficult to directly map the output to a lux value.

Both motion and light sensors are each capable of providing information on the position of the device relative to the user. Combining the information, however, is problematic, as the resulting position estimates will sometimes disagree. Additionally, position estimates from light sensors may be unreliable, as they can be heavily quantized and are inherently tied to the amount of light in the ambient environment. For example, a current mobile device may output an ALS reading of 10 lux when the true light intensity is anywhere between 0 and 167.5 lux. Thus, it may be difficult to distinguish between when a front face is occluded vs. when the device is in a moderate lit family room. Another example of unreliability is the proximity sensor, which in many devices reports a positive reading when inside the pant pocket of light colored denim jeans, but a negative reading when inside the pant pocket of dark colored denim jeans.

SUMMARY

A position estimate for a mobile device is generated using data from motion sensors, such as accelerometers, magnetometers, and/or gyroscopes, and data from light sensors, such as an ambient light sensor, proximity sensor and/or camera intensity sensor. A plurality of proposed positions with associated likelihoods is generated by analyzing information from the motion sensors and a list of candidate positions is produced based on information from the light sensors. At least one of the plurality of proposed positions is eliminated using the list of candidate positions and a position estimate for the mobile device is determined based on the remaining proposed positions and associated likelihoods. The proposed positions may be generated by extracting features from the information from the motion sensors and using models to generate likelihoods for the proposed positions. The likelihoods may be filtered over time. Additionally, a confidence metric may be generated for the estimated position.

In an embodiment, a method of determining a position estimate of a mobile device includes generating a plurality of proposed positions with associated likelihoods by analyzing information from one or more motion sensors in the mobile device; processing information from one or more light sensors in the mobile device to produce a list of candidate positions; eliminating at least one of the plurality of proposed positions using the list of candidate positions; and determining a position estimate for the mobile device based on remaining proposed positions and associated likelihoods.

In another embodiment, a mobile device includes motion sensors; a plurality of light sensors; memory; and a processor coupled to the memory and coupled to receive data from the motion sensors and coupled to receive data from the plurality of light sensors, the processor being configured to generate a plurality of proposed positions with associated likelihoods based on the data from one or more motion sensors, produce a list of candidate positions based on the data from the plurality of light sensors, eliminate at least one of the plurality of proposed positions using the list of candidate positions, determine a position estimate for the mobile device based on remaining proposed positions and associated likelihoods, and store the position estimate in the memory.

In another embodiment, a mobile device includes means for generating a plurality of proposed positions with associated likelihoods by analyzing information from one or more motion sensors in the mobile device; means for processing information from one or more light sensors in the mobile device to produce a list of candidate positions; means for eliminating at least one of the plurality of proposed positions using the list of candidate positions; and means for determining a position estimate for the mobile device based on remaining proposed positions and associated likelihoods.

In yet another embodiment, a non-transitory computer-readable medium including program code stored thereon, includes program code to generate a plurality of proposed positions with associated likelihoods by analyzing information from one or more motion sensors in the mobile device; program code to process information from one or more light sensors in the mobile device to produce a list of candidate positions; program code to eliminate at least one of the plu-rality of proposed positions using the list of candidate positions; and program code to determine a position estimate for the mobile device based on remaining proposed positions and associated likelihoods

DETAILED DESCRIPTION

Figures 1A, 1B:
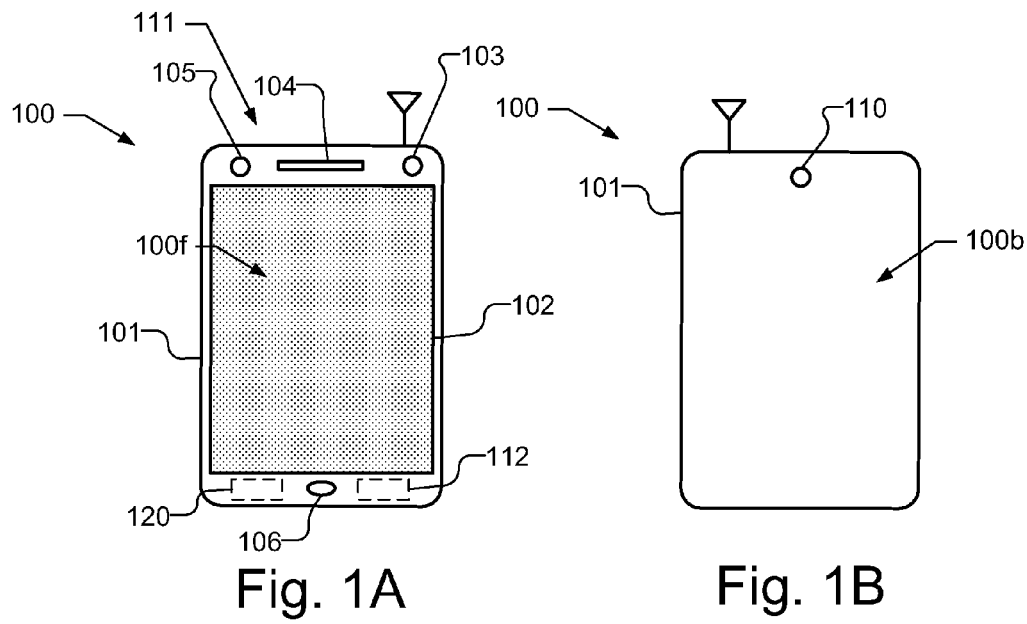
FIGS. 1A and 1B illustrate a front face and back face, respectively, of a mobile device, capable of using information from motion sensors and light sensors to derive a position estimate.

FIGS. 1A and 1B illustrate a front face $100f$ and back face $100b$, respectively, of a mobile device 100, capable of using information from motion sensors and light sensors to derive a position estimate. Mobile device 100 is illustrated as including a housing 101, a display 102, which may be a touch screen display, as well as a speaker 104 and microphone 106. The mobile device 100 includes an ambient light sensor (ALS) 103, which reports the intensity of the light (e.g., in lux) impinging on the front face of the device. The mobile device 100 may further include a proximity sensor 105, which reports the intensity of emitted infra-red light reflecting off objects that are near the front of the device. The mobile device 100 further includes a camera 110 to image the environment and which may be used as a back-side light intensity sensor. In one implementation, the ALS 103 may be a camera, or alternatively, a separate front facing camera on the front face $100f$ of the mobile device 100 may be used similar to back facing camera 110. The ALS 103, proximity sensor 105 and camera 110 may be collectively referred to as light sensors 111. Additionally, on-board motion sensors 112 are included in the mobile device 100. The motion sensors 112 may include, e.g., three-axis magnetometers and/or linear accelerometers and/or gyroscopes, and are referred to herein as motion sensors despite some sensors, e.g., magnetometers, measuring orientation because motion of the mobile device 100 may be derived from a change in orientation.

The light sensors 111 and the motion sensors 112 are each capable of providing information with respect to the position of the mobile device 100 relative to a user. The position information that is typically extracted from the motion sensors is the orientation of the mobile device 100 (e.g. is the mobile device being oriented vertical or horizontal) and/or the pattern of motion of the mobile device 100 that accompanies a periodic movement. For example, the pattern of motion of a mobile device 100 may differ when a user walks with the mobile device 100 in a pant pocket or with the mobile device 100 in a backpack. The position information that is typically extracted from light sensors 111 is whether the front or back face of the mobile device 100 is occluded. The information obtained from the motion sensors and the light sensors 111 is largely independent and therefore complementary. For instance, based on the orientation of the device, the motion sensors 112 may be able to determine that the mobile device 100 is either in a pant pocket of a sitting user or on a table (because the mobile device 100 is orientated horizontally), but not in a shirt pocket (as this would correspond to a vertical orientation). The light sensors 111, on the other hand, may be able to determine that the mobile device 100 is either in a pant pocket or shirt pocket (because both the front face $100f$ and back face $100b$ are occluded), but not on a desk (as this would have resulted in only one face of the mobile device 100 being occluded). As illustrated in FIG. 1A, mobile device 100 includes a classifier system 120 that uses the information from the light sensors 111 and motion sensors 112 in a process of elimination to determine a position of the mobile device 100 with a high degree of accuracy.

A problem when fusing position information from light sensors 111 and motion sensors 112 is determining how much confidence to assign to the estimates from each set of sensors. For example, the position estimates from the light sensors 111 and the motion sensors 112 may sometimes disagree. A disagreement between the different sets of sensors renders determining the position of the mobile device 100 difficult.

The classifier system 120 of the mobile device 100 uses an elimination approach based on confidence levels to fuse the position estimates from the light sensors 111 and the motion sensors 112. For example, the motion sensors 112 may produce confidence levels, sometimes referred to herein as likelihoods, for each possible position of the mobile device 100.

In a simple example, positions for the mobile device 100 may be ordered from most likely to least likely based on the data from the motion sensors 112. Additionally, a set of candidate positions is produced based on data from the light sensors 111. The candidate positions are positions of the mobile device 100 that are feasible. The candidate position produced by the light sensors 111 with the highest likelihood as determined by the motion sensors 112 is selected as the position of the mobile device 100. In other words, data from the light sensors 111 is used to eliminate from consideration certain positions determined by the motion sensors 112.

In more detail, the possible positions of the mobile device 100 may be denoted by $\{p_1, \ldots, p_M\}$. For example, $p_1$ might represent the mobile device 100 in a shirt pocket, $p_2$ in a pant pocket, $p_3$ in a hand, etc. . . . . Denote the overall position estimate by $\hat{p}$. Denote the likelihoods for each position, produced by the motion sensors 112, by $\{L_1, \ldots, L_M\}$. Denote the candidate positions produced by the light sensors 111 by $\{c_1, \ldots, c_N\}$, where $N \leq M$. Then the overall position decision is:

$$\hat{p} = \arg\max_{p_i \in \{c_1, \ldots, c_N\}} L_i. \qquad \text{eq. 1}$$

That is, if N=M the output of the light sensors 111 is effectively ignored. Conversely if N=1, the output of the motion sensors 112 is effectively ignored. It should be clear that the actual likelihood values $L_i$ themselves are not needed in order to make an overall position decision, only their ordering from most likely to least likely.

Figure 2:
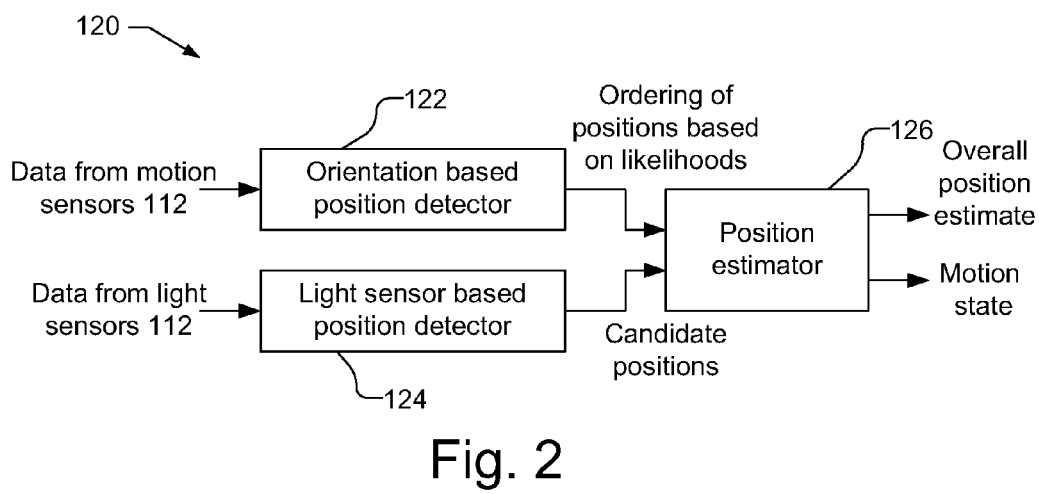
FIG. 2 illustrates an example of the classifier system used with the mobile device.

FIG. 2 illustrates an example of the classifier system 120 used with the mobile device 100. The classifier system 120 includes an orientation based position detector 122 that receives data from the motion sensors 112, e.g., accelerometers, magnetometers, gyroscopes, etc., and generates an ordering of positions based on the likelihoods of those positions. The classifier system 120 further includes a light sensor based position detector 124 that receives input data from the light sensors 111, e.g., ALS 103, proximity sensor 105 and camera 110, and generates candidate positions. The positions from the orientation based position detector 122 and the candidate positions from the light sensor based position detector 124 is received by a position estimator 126 that eliminates infeasible positions and produces the overall position estimate and motion state.

The orientation based position detector 122 may be a Bayesian classifier. A conventional Bayesian maximum likelihood (ML) classifier selects the class with the highest likelihood. The orientation based position detector 122, however, may be used to classify both motion state and position of the mobile device 100. The class may be considered a tuple (motion state, device position), where the tuple elements are referred to as subclasses. The orientation based position detector 122 may classify motion state marginalizing over position of the mobile device to obtain likelihoods for each motion state, and separately marginalizing over motion state to obtain likelihoods for each position of the mobile device. Alternatively, the motion state and device position combination with the highest likelihood may be selected, however, this approach is suboptimal as it assumes that motion state and device position are independent, which is not in general the case. Thus, orientation based position detector 122 may output both the position of the mobile device 100 with the highest marginalized likelihood, as well as the motion state with the highest marginalized likelihood.

The orientation based position detector 122 may compute a confidence metric that may be based on the separation between the log-likelihoods of the two most likely subclasses. The confidence metric is used to indicate when the marginalized likelihood value for the most probable subclass is only minutely greater than the marginalized likelihood value for the second most probable subclass, in which case, the data is equally suggestive of two different subclasses. This is often the case when the user transitions activity, say from running to walking, or pulling the mobile device 100 out of the pant pocket; at some point in time, the motion state or device position belongs to neither subclass. If the confidence metric falls below a certain threshold, no decision is outputted. The confidence test may be performed for both the motion state and position estimate. Thus, the orientation based position detector 122 may provide an estimate for one subclass, but not the other.

The orientation based position detector 122 may combine classifier outputs, e.g., by filtering the log-likelihood values over time. Combining classifier outputs over time may be used to produce a more accurate decision with a longer observation window, which may be appropriate, e.g., if a particular application has a longer latency target. For example, an application with a 1s latency target, would filter the past 15 log-likelihoods for each class for a 15s delay. Not only is this a computationally and conceptually simple operation, it is also optimal in an ML sense, assuming that the user state is constant over the filtering period. The use of filtering avoids a need to run multiple activity recognition tasks in parallel when multiple applications have different latency targets.

The light sensor based position detector 124 may use hard-coded rules to determine whether one face of the device is occluded, both faces are occluded, or neither face is occluded. The occlusion information is then used to construct a list of feasible positions for the mobile device 100. For example, if both faces of the mobile device 100 are occluded, it is highly unlikely that the device is held in the hand (as the location of the sensors are such that an unnatural grip is required to occlude them both), and also highly unlikely that it is resting on a desk. Alternatively, if one side of the mobile device 100 is occluded but the other is not, it is highly likely that the mobile device 100 is on a desk. The list of feasible positions is used to eliminate infeasible device positions for which log-likelihoods have been computed by the orientation based position detector 122 of the classifier (i.e. the corresponding log-likelihood values are dropped to $-\infty$).

The reason for the use of hard-coded rules in the light sensor based position detector 124, as opposed to the machine learning/feature based approach adopted in the orientation based position detector 122, is twofold. Firstly, the outputs of available light sensors are fickle, with the ALS and proximity outputs being heavily quantized, and the camera output being controlled by an AGC mechanism that is difficult to disable. Secondly, training a statistical model based on lighting conditions is a problematic endeavor. The results would be heavily dependent on alignment between the lighting conditions during training, and the lighting conditions present during system operation.

Figure 3:
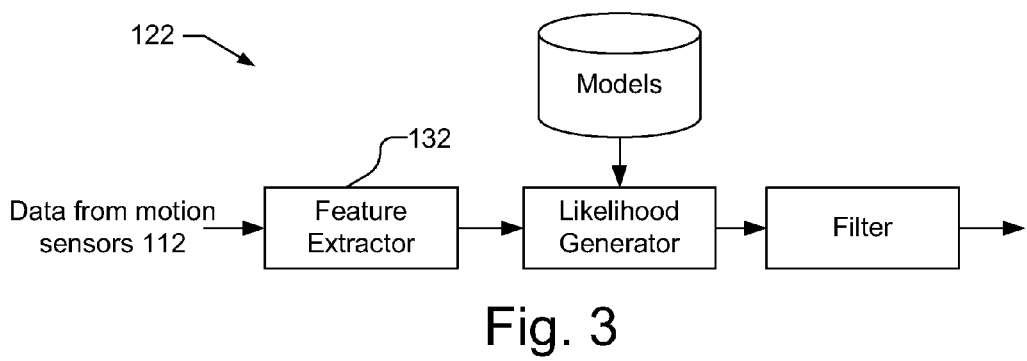
FIG. 3 illustrates an embodiment of a motion sensor based position detector in the classifier system.

FIG. 3 illustrates an embodiment of the orientation based position detector 122, which is illustrated as including a feature extractor 132, a likelihood generator 134 that receives the output of the feature extractor 132 and uses a model from a database 136 to produces likelihood values for the classes, which are filtered by filter 138 to produce the position estimate and the motion state estimate. The feature extractor 132 computes a feature vector for, e.g., every one second of raw data from the motion sensors 112. Each feature element in this vector corresponds to a property of the signal that helps discriminate between the desired classes. For example, the simplest feature describes the standard deviation in the accelerometer output over the 1 second window. When the user is stationary, this feature will be small, when the user is walking, more variation will be present and the corresponding feature will be larger. When the user is running there will be more variation still, and this feature will be large still. Another example of a simple feature is the orientation of the mobile device 100. When a user is sitting with the device in a pant pocket, the mobile device 100 will typically be lying flat, whereas when the user stands up the mobile device 100 will be vertical.

A number of features are extracted from the raw motion sensor data. The raw data may be sampled at 60 Hz, or other desired rate. By way of example, at each time instance, the feature extractor 132 takes as input one second of data corresponding to sixty, 3-dimensional vector samples (x, y and z axes) from motion sensors 112, which for the sake of simplicity will be described as a 3-axis accelerometer. Thus, the net input size in a one second time instance is 180 samples. A number of features, e.g., 18 features, may be computed from the data. More or fewer features may be used if desired.

Denoting accelerometer samples $a(n)=[a_x(n)\ a_y(n)\ a_z(n)]$. Let N=60 denote the number of vector samples in the window over which a feature is computed. Possible features include the following, but it should be understood that different features may be used if desired.

Standard Deviation of Accelerometer Norm (sa)—Given each 3D accelerometer vector, the norm is computed and the standard deviation is estimated. The Standard Deviation of Accelerometer Norm (sa) is useful for discriminating between sit/stand, walk and run motion states, as they are distinguishable by the varying degree of the accelerometer variation.

Figure 4:
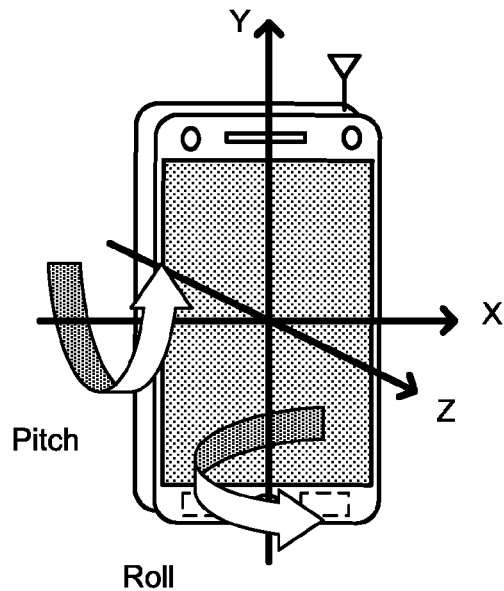
FIG. 4 illustrates the mobile device with pitch and roll identified.

Average Pitch (ap)—Using the accelerometer, it is possible to learn the orientation of the surface of the device with respect to gravity. This orientation is characterized by two angles referred to as pitch and roll. Pitch is the rotation around the x-axis and ranges from $(-\pi,\pi]$ as illustrated in FIG. 4. The average pitch may be computed by averaging the accelerometer vector and then computing the pitch as follows:

$$ap = \mathrm{atan2}\left(\frac{1}{N}\sum_{n=1}^{N} a_y(n), \frac{1}{N}\sum_{n=1}^{N} a_z(n)\right). \quad \text{eq. 2}$$

The average pitch (ap), and average roll (ar) described below, are useful for discriminating between sitting and standing when the device is in the pant pocket (and to a lesser degree, hand) and for determining device position.

Average Roll (ar)—As discussed above, the other angle for orientation is roll. Roll is the rotation around the y-axis and ranges from $(-\pi/2, \pi/2]$. The average roll may be determined as follow:

$$ar = \mathrm{atan2}\left(\frac{1}{N}\sum_{n=1}^{N} a_x(n), \frac{1}{N}\sum_{n=1}^{N} a_z(n)\right). \quad \text{eq. 3}$$

Average Theta ($\theta$)—From the accelerometer, it is also possible to learn the orientation of the surface of the mobile device 100 with respect to the direction of motion. This orientation is also characterized by two angles, which are referred to as theta ($\theta$) and phi ($\phi$). To estimate the direction of motion, we perform an eigendecomposition on the accelerometer data. The eigendecomposition creates a coordinate frame relative to the directions in which the data has the highest energy. The eigen-vector associated with the largest eigen-value will point in the direction of maximum energy. The eigen-vector associated with the second largest eigen-value will point in the direction of maximum energy within the plane orthogonal to the first eigen-vector, and so on. When the user is walking or running, the direction of strongest energy will typically correspond to the direction of gravity. Thus the eigen-vector associated with the largest eigen-value should point downward. The eigen-vector associated with the second largest eigen-value will then lie in the plane orthogonal to gravity (i.e. horizontal). When the user is walking or running, the direction of highest energy in this plane will typically correspond to the direction of motion, and hence this eigen-vector should point in this direction.

Denote the accelerometer data matrix:

$$A = \begin{bmatrix} a_x(1) & \ldots & a_x(N) \\ a_y(1) & \ldots & a_y(N) \\ a_z(1) & \ldots & a_z(N) \end{bmatrix}. \quad \text{eq. 4}$$

Denote the eigen-vector corresponding to the second largest eigen-value of $AA^T$ by $v=[v_x\ v_y\ v_z]_T$. The first angle characterizing the orientation of the mobile device 100 with respect to the direction of motion is then:

$$\theta = a\tan 2(v_y, v_x). \quad \text{eq. 5}$$

Theta ranges from $(-\pi, \pi]$.

Computing features corresponding to the orientation of the mobile device 100 relative to the direction of motion, helps discriminate between different device positions when the user is walking or running. For instance, when the mobile device 100 is located in a shirt pocket, the mobile device 100 will either face toward the direction of motion, or in the reverse direction, whereas when the mobile device 100 is located in a holster, the orientation with respect to the walk or run direction will be different.

Average Phi ($\phi$)—The second angle characterizing the orientation of the mobile device 100 with respect to the direction of motion is:

$$\phi = \mathrm{acos}\left(\frac{v_z}{\|v\|}\right). \quad \text{eq. 6}$$

Phi ranges from $(-\pi/2, \pi/2]$.

Ratio of the Norm of Accelerometer Mean to the Mean of the Accelerator Norm (rm)—As the name suggests, this feature is $$rm = \frac{\sqrt{\left(\frac{1}{N}\sum_{n=1}^{N} a_x(n)\right)^2 + \left(\frac{1}{N}\sum_{n=1}^{N} a_y(n)\right)^2 + \left(\frac{1}{N}\sum_{n=1}^{N} a_z(n)\right)^2}}{\frac{1}{N}\sum_{n=1}^{N} \sqrt{a_x(n)^2 + a_y(n)^2 + a_z(n)^2}} \quad \text{eq. 7}$$

This feature provides a measure of "smoothness" in the acceleration. If the motion is relatively smooth with few abrupt changes then the value of rm will be close to unity. However, if the acceleration contains abrupt, short-term changes (such as when the user is fiddling) then the value will be less than one. This is because the abrupt changes will be filtered out by taking the mean of all acceleration samples and afterwards computing the norm in the numerator. However, since the denominator is the mean of each individual norm, it will be affected much more than the numerator by abrupt changes and, in the case of fiddling, will be larger than the numerator. Therefore, $rm \in [0, 1]$.

Mel-Frequency Cepstral Coefficients (MFCCs)—MFCCs are universally employed in speech recognition engines as they provide an effective parameterization of the spectral envelope of a waveform. In speech applications, this spectral envelope characterizes the physical configuration of the vocal tract, mouth and lips, responsible for generating each aurally distinct utterance. We have found that MFCCs are similarly useful for distinguishing waveforms arising from different types of motions or gaits. For example accelerometer traces generated by a user walking with a device in their pant pocket vs. hand, are directly analogous to microphone traces generated by recordings of utterances of phones aa vs. eh—the only difference being the time scale over which these events occur. In the case of walking or running, the minimum fundamental frequency is on the order of 1-2 Hz, whereas in speech, the minimum fundamental frequency is on the order of 50-100 Hz. The use of MFCCs has been found to improve the classifier performance of the orientation based position detector 122, particularly with respect to classifying the position of the mobile device 100 when the user is moving. The computation of MFCCs is directly adopted from the conventional computation performed in speech recognition, which is well known in the art of digital signal processing. We initially compute 13 MFCCs for each accelerometer axis (the first MFCC is replaced with the log-energy), using 23 filter banks with triangular shaped (in magnitude) filters in the mel-domain. Prior to MFCC computation, a Hamming window is applied to each accelerometer trace. Denote these $$M_x(1), \ldots, M_x(13)$$

$$M_y(1), \ldots, M_y(13).$$

$$M_z(1), \ldots, M_z(13) \quad \text{eq. 8}$$

The best performance was obtained by only using the first four coefficients of each axes. These may be concatenated into a vector to yield:

$$\text{MFCCs} = [M_x(1), \ldots, M_x(4), M_y(1), \ldots, M_y(4), M_z(1), \ldots, M_z(4)]. \quad \text{eq. 9}$$

The computed features from the feature extractor 132, shown in FIG. 3, may be concatenated into an 18 dimensional vector $f(A)$, which is provided to a likelihood generator 134. The feature vectors may be modeled, e.g., using a Gaussian Mixture Model (GMM), which are stored in a database 136 that is coupled to the likelihood generator 134. The parameters of the GMM may be learned offline from training data collected, as described below. Presented with a new feature vector from the feature extractor 132, the likelihood generator 134 uses the GMM models from the database 136 to compute log-likelihood values for each class.

The priors, means and covariances of the GMM for the class $\omega_{i,j}$ consisting of the $i^{th}$ motion state and $j^{th}$ device position, are denoted $\pi_{i,j}(m)$, $\mu_{i,j}(m)$, and $\Sigma_{i,j}(m)$ respectively. Here $m \in \{1, \ldots, M\}$ denotes the mixture components. For each class $\omega_{i,j}$ a likelihood value is computed from $f(A)$.

$$P(f(A)|\omega_{i,j}) = \sum_{m=1}^{M} \frac{\pi_{i,j}(m)}{\sqrt{2\pi|\sum_{i,j}(m)|}} \times \exp(-(f(a) - \mu_{i,j}(m))^T \sum_{i,j}(m)^{-1}(f(A) - \mu_{i,j}(m))). \quad \text{eq. 10}$$

The logarithms of the likelihood values may be computed and arranged into a log-likelihood matrix log:

$$L_{i,j} = \log P(f(A)|\omega_{i,j}). \quad \text{eq. 11}$$

Thus, one overall log-likelihood matrix $L_{ij}$ is computed at the sampling rate of the feature extractor 132, e.g., once every second. To highlight this, we now index these matrices in time via $L_{ij}(k)$ where $k=1, 2, \ldots$. That is, $L_{ij}(1)$ is outputted at t=1 s, $L_{ij}(2)$ is outputted at t=2s, etc. . . . .

The filter 138 is coupled to receive the log-likelihood matrix $L_{ij}(k)$ from the likelihood generator 134. The filter 138 combines the log-likelihood matrices $L_{ij}(k)$ over time. Denote the latency target by K seconds. The overall log-likelihood may be obtained via a straight forward moving average filter:

$$L_{ij}(k) = \frac{1}{K} \sum_{l=0}^{K-1} L_{i,j}(k-l). \quad \text{eq. 12}$$

In addition to its simplicity, this operation has another desirable property. Assuming the user class is constant over the filtering period, it corresponds to ML combining of the likelihood values. More specifically, the resulting Bayesian classifier that makes a decision given all the features over the K observation window is ML, under the assumption that the data in the observation windows is conditionally independent given the user class.

Referring back to FIG. 2, the light sensor based position detector 124 uses may use hard-coded rules to determine whether one face of the device is occluded, both faces are occluded, or neither face is occluded, from which feasible positions are determined. For example, if the data from the light sensors 111 indicate that both faces of the mobile device 100 are occluded, then the candidate positions are bag, backpack, purse, pant pocket, shirt pocket, etc. . . . If neither side of the mobile device 100 is occluded, the candidate position is hand. If one face of the mobile device 100 is occluded and the other is not occluded, the candidate positions are either desk, or the side/mesh pocket of a backpack. The candidate positions may be refined by analyzing the intensity of the detected light, i.e., if the intensity of light is high on one face of the mobile device 100, but near zero on the other, the candidate position is the desk.

More specifically, rules can be used for inferring device position using the light sensors 111 as follows. These rules are designed with the limitations of the light sensors, discussed above, in mind. Let prox=1 denote the event that the proximity sensor 105 registers (meaning an object is close of the front left corner of the mobile device 100), and prox=0 denote the event that no proximity is registered by proximity sensor 105. Denote the output of ALS 103 by als. Denote the intensity output of the camera 110 by cam. Let min_ALS_value denote the minimum ALS value the mobile device 100 outputs (given its quantization bins). For example, the min_ALS_value may be 10 lux for particular cellular phones. Let min_camera denote the minimum camera intensity reported and δ denote a small amount of camera intensity. Three mutually exclusive indicator functions may be defined as follows.

1. desk={als>300 lux} & {prox=0} & {cam<min_camera+δ}

2. hand={als>min_ASL_value} & {prox=0} & {cam>min_camera+δ}

3. concealed={als=min+ASL_value} & {prox=1} & {cam<min_camera+δ}   Eq. 13 where & denotes the logical AND operation. The desk state corresponds to the mobile device 100 being placed face up on a desk, as this is the only feasible device position given that the ALS reports >300 lux, the proximity reports that no object is proximate, and the camera intensity is within δ of its minimum value. The hand state corresponds to the mobile device 100 being in the user's hand, as this is the only feasible device position given that the ALS reports a value greater than the minimum, the proximity reports that no object is proximate, and the camera intensity is more than δ above its minimum value. The concealed position corresponds to the device being concealed in a bag, backpack, pocket, etc. . . . , as these are the only feasible positions given the ALS reports a value equal to the minimum value, the proximity reports that an object is proximate, and the camera intensity is within δ of its minimum value. If the set of device positions includes desk, hand, bag, etc. . . . then the above three rules can be used to create a candidate set, as per the discussion above. For example, if the set of device positions is $p_1$=shirt pocket, $p_2$=pant pocket, $p_3$=hand, $p_4$=purse, $p_5$=backpack, $p_6$=holster, $p_7$=desk, $p_8$=jacket, then the above three rules are capable of generating candidate sets of $\{p_1\}$, $\{p_3\}$, $\{p_1, p_2, p_4, p_5, p_6, p_8\}$, respectively. If neither of the three rules are met, then the light sensors will output all positions in the candidate set, i.e. $\{p_1, p_2, p_3, p_4, p_5, p_6, p_7, p_8\}$. Thus, the light sensor based position detector 124 produces a signal indicative of feasible positions.

If one of these indicators is true, the list of feasible device positions is narrowed accordingly by the position estimator 126 in FIG. 2. This is done by setting $L_{ij}(k) = -\infty$ for the infeasible positions j. If none of these indicator functions are true, no action is taken and the data from the light sensors 111 has no bearing on the overall classification decision.

While the indicator functions have a non-negligible false-positive rate (i.e. they often miss instances where the device position is actually on desk, in hand, or concealed), the false-negative rate is low. That is, if the indicator function is true, it is almost always the case that the device is in one of the feasible positions indicated. The false-negative rates are illustrated in the following table 1.

TABLE 1

| (%) | Desk(k) = 0 | Desk(k) = 1 |
|---|---|---|
| Not on Desk | 99.7 | 0.3 |
| On Desk | 61.6 | 38.4 |

| (%) | Hand(k) = 0 | Hand(k) = 1 |
|---|---|---|
| Not in Hand | 98.5 | 1.5 |
| In Hand | 59.9 | 40.1 |

| (%) | Concealed(k) = 0 | Concealed(k) = 1 |
|---|---|---|
| Not Concealed | 100.0 | 0.0 |
| Concealed | 57.2 | 42.8 |

Given the filtered log-likelihood matrices $L_{ij}(k)$, we marginalize over each subclass to obtain the marginalized log-likelihoods. This may be done in the linear domain, as marginalization corresponds to summing probabilities. For motion state we have, $$L_{M,i}(k) = \log\left(\sum_{j=1}^{K_P} \exp(L_{ij}(k))\right), \qquad \text{eq. 14}$$

for $i=1, \ldots, K_M$, and for device position, $$L_{P,j}(k) = \log\left(\sum_{i=1}^{K_M} \exp(L_{ij}(k))\right), \qquad \text{eq. 15}$$

for $j=1, \ldots, K_P$.

As discussed above, a confidence test may also be performed to indicate when the data is equally suggestive of two different subclasses. The confidence metric is based on the difference between the log-likelihoods of the two most probable subclasses:

$$C_M(L_{M,i}(k)) = \frac{L_{M,i1}(k) - L_{M,i2}(k)}{|L_{M,i1}(k)| + |L_{M,i2}(k)|}, \qquad \text{eq. 16}$$

where i1 and i2 are the indices of the most likely, and second most likely subclasses, respectively. Likewise for device position we have $C_P(L_{P,j}(k))$. Note that the confidence metric always lies between 0 and 1, with 1 indicating high decision confidence and 0 indicating low confidence. The metric takes on the value 0 if and only if the two most probable classes are equal likely, and the value 1 if and only if the most probable class is infinitely more likely than the second most probable.

The confidence tests for the classifier are then simply $$C_M(L_{M,i}(k)) > C_{thresh\_M} \text{ and } C_P(L_{P,j}(k)) > C_{thresh\_P}. \qquad \text{eq. 17}$$

As a further enhancement, different confidence thresholds may be used depending on which subclass has the highest likelihood. For example if a motion state "walk" has the highest likelihood, the walk confidence threshold is employed. These confidence thresholds are set such that a fixed fraction of decisions are discarded for each underlying subclass, e.g., typically 20%, but other fixed fractions of discarded decisions may be used.

The position estimator 126 in FIG. 2 outputs the subclasses with the highest marginalized likelihoods as the final decisions for the motion state and device position. In the event that a subclass fails the confidence test, the position estimator 126 does not output a decision for that subclass, i.e. the kth final outputs is $$\hat{\omega}_M(k) = \begin{cases} \operatorname{argmax}_{i \in \{1,\ldots,K_M\}} L_{M,i}(k) & \text{if } C_M(L_{M,i}(k)) > C_{thresh\_M} \\ \text{unknown} & \text{otherwise} \end{cases} \qquad \text{eq. 18}$$

and $$\hat{\omega}_P(k) = \begin{cases} \operatorname{argmax}_{i \in \{1,\ldots,K_P\}} L_{P,i}(k) & \text{if } C_M(L_{P,i}(k)) > C_{thresh\_P} \\ \text{unknown} & \text{otherwise} \end{cases}.$$

As discussed above, the parameters of the GMM stored in database 136 may be learned offline from training data. Training the system corresponds to learning the statistics of the feature vectors for each class. As the feature vectors are parametrically modeled by GMMs, this is equivalent to estimating the priors, mean vectors and covariance matrices for each class. That is, for each combination of motion state i and device position j, the parameters $\pi_{i,j}(m)$, $\mu_{i,j}(m)$, and $\Sigma_{i,j}(m)$ are learned for mixture components m=1, ..., M. Additionally, the optimal number of mixture components may be found.

The parameters are learned by collecting labeled data for each motion state and device position combination. The data samples can be indexed $A_{i,j}(k)$, where i and j respectively index the motion state and device position, and k indexes the sample number. These samples may be collected so that the empirical distribution of the dataset matches the true probability distribution of the data, as closely as possible. In other words, multiple test subjects, trials and devices may be used in order to ensure sufficient diversity.

Given the labeled data samples, the GMM is trained using the expectation-maximization (EM) algorithm, initialized by K-means. The K-means algorithm may be initialized using a random subset of K feature vectors. We found that multiple initializations of the K means lead to a negligible improvement and hence only a single initialization may be used. In learning the GMM parameters, we treat the non-MFCC and MFCC features differently. The 6 non-MFCC features are treated as independent random variables, jointly independent of the 12 MFCC features. The 12 MFCC features are treated as dependent random variables. When training the system, each non-MFCC feature is trained separately and the 12 MFCC features are jointly trained separately. When the covariance matrices $\Sigma_{i,j}(m)$ are then constructed from the training results, zeros are placed in the appropriate off-diagonal entries, specifically, $\Sigma_{i,j}(m)=0$ for $i \neq j$, $i \leq 6$, $j \leq 6$, and also for $i>6$, $j \leq 6$ and $i \leq 6$, $j>6$. The optimal number of mixture components is primarily a function of the amount of data collected. It is chosen by running cross-validation tests. We use the leave-one-out technique which involves splitting the collected data into different test and train set combinations. The train set consists of data from all subjects but one. The test set consists of the remaining subject. Results are generated for each combination of left-out subject and then averaged. This is done for different values of M, namely 1, 2, 3, 4, 5, 6, 8, 10, 12 and 16 mixture components. We found that for the dataset we had collected, 4 mixture components was optimal.

Data may be collected from a number of different mobile devices, with the output of the motion sensors 112 and light sensors 111 logged. Devices with different sampling rates may be resampled to the desired sampling rate in post-processing. Data may be collected using a number of subjects, i.e., users. Each subject may perform, e.g., two trials of each motion state/device position combination, with all of the mobile devices. Examples of motion state include walk, run, sit, stand, and fiddle, and examples of device position include shirt pocket, pant pocket, hand, bag, holster, desk, and jacket pocket. It should be noted that not all combinations are feasible, such as walk/desk. Data may be collected for various activities performed in a range of environments both indoors and outdoors. For example, walk data may include stairs (up and down), run data may include jogging, running and sprinting, on both the ground and a treadmill. Sit data may include a diverse range of seating positions on a range of different seats. Likewise, stand data may include a range of different standing positions involving varying degrees of leaning and lateral movement.

In an alternative approach, likelihoods from the orientation based position detector 122 and the light sensor based position detector 124 are combined. For example, the data from the light sensors 111 is processed to classify the device position using likelihood values for each device position, similar to the classification performed by the orientation based position detector 122 discussed above. For example, as discussed above, features may be extracted from the data from the light sensors 111, with the results provided to a likelihood generator that uses models stored in a database to determine the likelihood for each position. A filter may also be used to combine likelihoods for desired positions over time, e.g., for applications with longer latency times. The likelihood values for each position from the orientation based position detector 122 and the light sensor based position detector 124 may be multiplied to produce an overall likelihood value for each position. The position with the highest overall likelihood value may be produced as the position estimate.

In more detail, the position likelihood values coming from the motion and light sensor data respectively, may be denoted as $L_{motion,i}$ and $L_{light,i}$. Then the position estimate is given by:

$$\hat{p} = \arg\max_{p_i \in \{p_1, \ldots, p_M\}} L_{motion,i} \times L_{light,i}$$

In terms of log-likelihood values, the position estimate would be given by $$\hat{p} = \arg\max_{p_i \in \{p_1, \ldots, p_M\}} \log(L_{motion,i}) + \log(L_{light,i})$$

Note that the previously solution can be expressed in the above framework of eliminating positions outputted by the motion branch by setting $L_{light,i}=1$ for all candidate positions $p_i \in \{c_1, \ldots, c_N\}$ and setting $L_{light,i}=0$ for all eliminated positions $p_i \{p_1, \ldots, p_M\} \setminus \{c_1, \ldots, c_N\}$.

Figure 5:
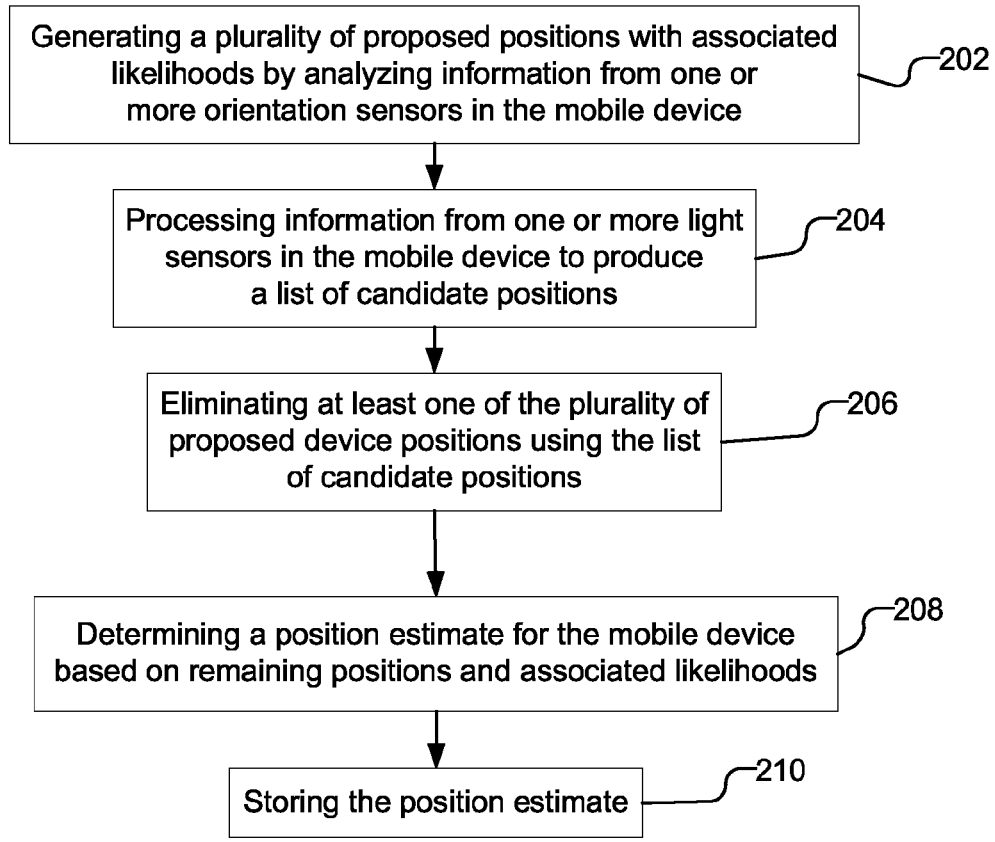
FIG. 5 is a flow chart illustrative of a method of determining a position estimate of a mobile device based on information from motion sensors and light sensors in the mobile device.

FIG. 5 is a flow chart illustrative of a method of determining a position estimate of a mobile device based on information from motion sensors and light sensors in the mobile device. As illustrated, a plurality of proposed positions with associated likelihoods is generated by analyzing information from one or more motion sensors in the mobile device (202). The position estimates may be output with any frequency (e.g., 3 Hz, 15 Hz, etc.). The plurality of proposed positions with associated likelihoods may be generated by extracting features from the information from one or more motion sensors, accessing models of features, and using the features and the models of features to generate likelihoods for each of the plurality of proposed positions. Additionally, if desired, the plurality of proposed positions with associated likelihoods may be filtered over time.

Information from one or more light sensors in the mobile device is processed to produce a list of candidate positions (204). The list of candidate positions may include one or more candidate positions. At least one of the plurality of proposed device positions is eliminated using the list of candidate positions (206). For example, any proposed position that is not included in the list of candidate positions may be eliminated. A position estimate for the mobile device is determined based on remaining proposed positions and associated likelihoods (208), which may then be stored which is stored (210), e.g., in memory. The determined position estimate may be used to control the mobile device in various ways, such as controlling device access time (e.g., controlling the number of rings until a call is forwarded to voicemail), estimating latency in user response to text messages and email, efficiently controlling resource management for applications (e.g. if the mobile device 100 is in a purse/pocket, the screen is disabled, while if it is in a bag, the mobile device 100 is put in sleep mode), improving performance of a motion classifier, adjusting ring volume, etc.

Additionally, a confidence metric associated with the position estimate may be generated. The confidence metric may be generated based on a difference of likelihoods of two most likely proposed positions after eliminating the at least one of the plurality of proposed device positions using the at least one candidate position.

Additionally, associated likelihoods may be generated for candidate positions in the list of candidate positions. The likelihoods associated with each of the proposed positions may be multiplied with the likelihoods associated with the candidate positions to determine a proposed position with a highest combined likelihood level that is used as the position estimate. In such an implementation, the act of eliminating at least one of the plurality of proposed device positions using the list of candidate positions (206) and the act of determining a position estimate for the mobile device based on remaining proposed positions and associated likelihoods (208) are functionally performed at the same time.

It should be understood that if desired, the information from the light sensors may be processed (206) to produce the list of candidate positions prior to generating a plurality of proposed positions using information from the motion sensors (202). Additionally, the plurality of proposed position generated from the motion sensor data may occur at different times than the candidate positions produced from the light sensor data. At any point in time, however, the overall position estimate 19 is a function of the current proposed positions generated from the motion sensor data and the candidate positions produced from the light sensor data. Additionally, if desired, if a concrete decision on the device position is not required, the position estimate may be the candidate positions and their associated likelihoods.

Figure 6:
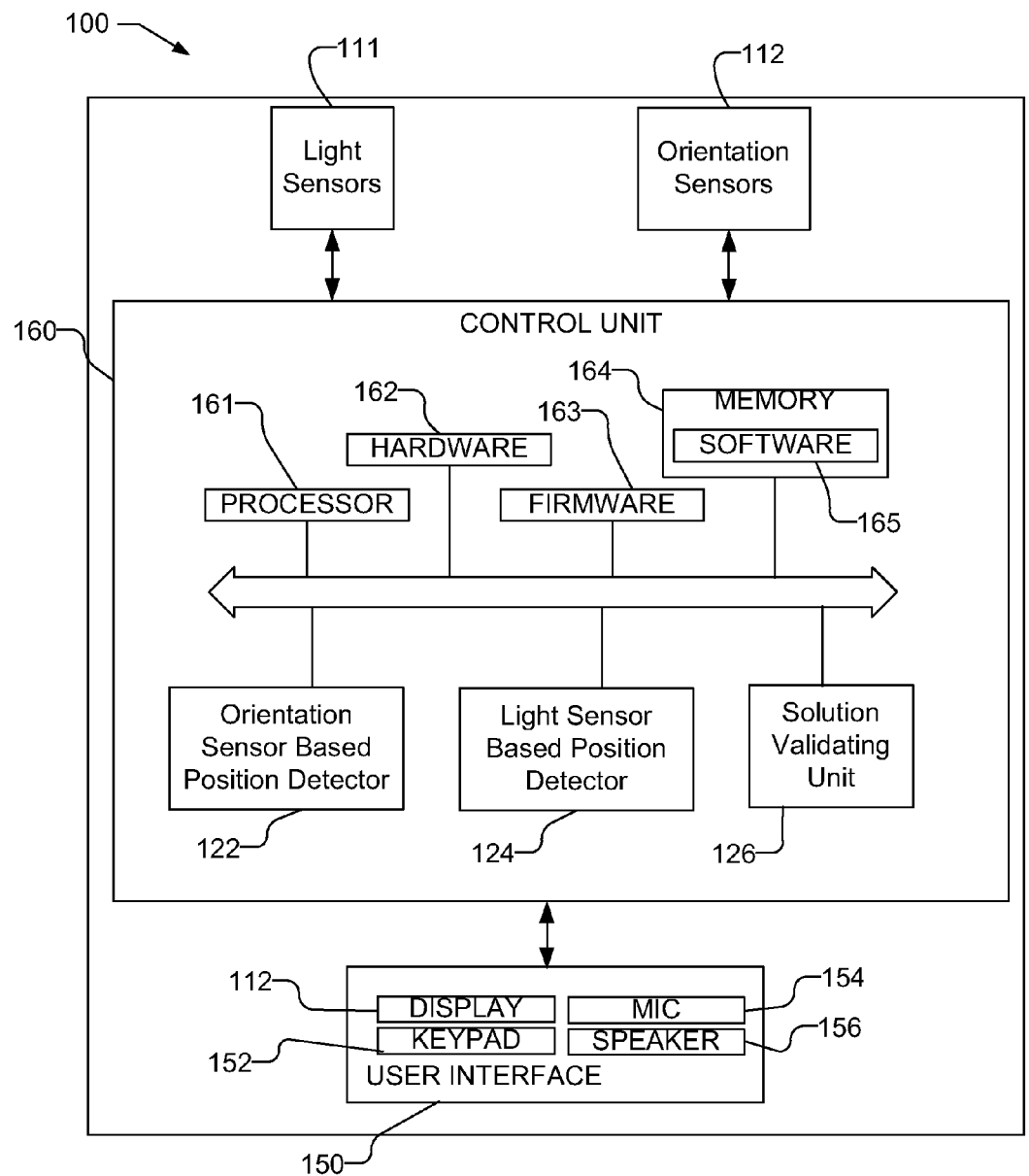
FIG. 6 is a block diagram of a mobile device capable of determining a position estimate of based on information from motion sensors and light sensors.

FIG. 6 is a block diagram of a mobile device 100 capable of determining a position estimate of based on information from motion sensors and light sensors as described above. The mobile device 100 includes a means for generating light sensor data, such as light sensors 111, which may include the ALS 103, proximity sensor 105 and camera 110 (shown in FIGS. 1A and 1B). The mobile device 100 also includes a means for generating orientation data, such as motion sensors 112, which may be one or more of accelerometers, gyroscopes, magnetometers, or other similar sensing elements. The mobile device 100 may further include a user interface 150 that includes the display 102, as well as a keypad 152 or other input device through which the user can input information into the mobile device 100. If desired, the keypad 152 may be obviated by integrating a virtual keypad into the display 102 with a touch sensor (or gesture control). The user interface 150 may also include a microphone 154 and speaker 156, e.g., if the mobile device 100 is a cellular telephone, tablet computer, or similar device. Of course, mobile device 100 may include other elements unrelated to the present disclosure.

The mobile device 100 also includes a control unit 160 that is connected to and communicates with the light sensors 111 and motion sensors 112. The control unit 160 accepts and processes the data provided by the light sensors 111 and the motion sensors 112. The control unit 160 may be provided by a processor 161 and associated memory 164, hardware 162, software 165, and firmware 163. The control unit 160 may include the orientation based position detector 122 and the light sensor based position detector 124, and position estimator 126, as described in FIGS. 2 and 3. The position and motion state estimate may be stored in memory 164 or other storage unit as the position and orientation of the mobile device 100.

The orientation based position detector 122 and the light sensor based position detector 124, and position estimator 126 are illustrated separately from processor 161 for clarity, but may be part of the processor 161 or implemented in the processor based on instructions in the software 165 which is run in the processor 161. It will be understood as used herein that the processor 161 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method of determining a position estimate of a mobile device with respect to a user, comprising:
   receiving signals from at least one motion sensor in the mobile device;
   analyzing the signals from the at least one motion sensor in the mobile device to generate a plurality of proposed positions with respect to the user with associated likelihoods;
   receiving signals from at least one light sensor in the mobile device;
   processing the signals from the at least one light sensor in the mobile device to produce a list of candidate positions;
   eliminating at least one of the plurality of proposed positions using the list of candidate positions; and
   determining the position estimate for the mobile device with respect to the user based on remaining proposed positions and associated likelihoods.

2. The method of claim 1, wherein eliminating at least one of the plurality of proposed positions using the list of candidate positions comprises eliminating any proposed position that is not included in the list of candidate positions.

3. The method of claim 1, wherein the at least one motion sensor comprises at least one of accelerometers, magnetometers, and gyroscopes.

4. The method of claim 1, wherein the at least one light sensor comprises at least one of an ambient light sensor, proximity sensor and camera intensity sensor.

5. The method of claim 1, wherein analyzing the signals from the at least one motion sensor in the mobile device to generate the plurality of proposed positions with associated likelihoods comprises:
   extracting features from the signals from the at least one motion sensor;
   accessing models of features; and
   using the features and the models of features to generate likelihoods for each of the plurality of proposed positions.

6. The method of claim 5, further comprising filtering the plurality of proposed positions with associated likelihoods over time.

7. The method of claim 1, further comprising generating a confidence metric associated with the position estimate.

8. The method of claim 7, wherein the confidence metric is generated based on a difference of likelihoods of two most likely proposed positions after eliminating the at least one of the plurality of proposed positions using the list of candidate positions.

9. The method of claim 1, further comprising generating likelihoods that are associated with candidate positions in the list of candidate positions, wherein eliminating at least one of the plurality of proposed positions using the list of candidate positions comprises multiplying the likelihoods associated with each of the plurality of proposed positions with the likelihoods associated with the candidate positions to determine a proposed position with a highest combined likelihood level that is used as the position estimate.

10. The method of claim 1, wherein processing the signals from the at least one light sensor to produce the list of candidate positions is performed prior to generating the plurality of proposed positions with associated likelihoods.

11. A mobile device comprising:
at least one motion sensor;
at least one light sensor;
memory; and
a processor coupled to the memory and coupled to receive signals from the at least one motion sensor and coupled to receive signals from the at least one light sensor, the processor being configured to analyze the signals from the at least one motion sensor to generate a plurality of proposed positions with respect to a user with associated likelihoods, process the signals from the at least one light sensor to produce a list of candidate positions, eliminate at least one of the plurality of proposed positions using the list of candidate positions, determine a position estimate for the mobile device with respect to the user based on remaining proposed positions and associated likelihoods, and store the position estimate in the memory.

12. The mobile device of claim 11, wherein the processor is configured to eliminate at least one of the plurality of proposed positions using the list of candidate positions by being configured to eliminate any proposed position that is not included in the list of candidate positions.

13. The mobile device of claim 11, wherein the at least one motion sensor comprises at least one of accelerometers, magnetometers, and gyroscopes.

14. The mobile device of claim 11, wherein the at least one light sensor comprises at least one of an ambient light sensor, proximity sensor and camera intensity sensor.

15. The mobile device of claim 11, wherein the processor is configured to analyze the signals from the at least one motion sensor to generate the plurality of proposed positions with associated likelihoods by being configured to:
extract features from the signals from the at least one motion sensor;
access models of features; and
use the features and the models of features to generate likelihoods for each of the plurality of proposed positions.

16. The mobile device of claim 15, wherein the processor is further configured to filter the plurality of proposed positions with associated likelihoods over time.

17. The mobile device of claim 11, wherein the processor is further configured to generate a confidence metric associated with the position estimate.

18. The mobile device of claim 17, wherein the processor is configured to generate the confidence metric based on a difference of likelihoods of two most likely proposed positions after eliminating the at least one of the plurality of proposed positions using the list of candidate positions.

19. The mobile device of claim 11, wherein the processor is further configured to generate likelihoods that are associated with candidate positions in the list of candidate positions, wherein the processor is configured to eliminate at least one of the plurality of proposed positions using the list of candidate positions by being configured to multiply the likelihoods associated with each of the plurality of proposed positions with the likelihoods associated with the candidate positions to determine a proposed position with a highest combined likelihood level that is used as the position estimate.

20. The mobile device of claim 11, wherein the processor is configured to produce the list of candidate positions before generating the plurality of proposed positions with associated likelihoods.

21. A mobile device comprising:
means for receiving signals from at least one motion sensor in the mobile device;
means for analyzing the signals from the at least one motion sensor in the mobile device to generate a plurality of proposed positions with respect to a user with associated likelihoods;
means for receiving signals from at least one light sensor in the mobile device;
means for processing the signals from the least one light sensor in the mobile device to produce a list of candidate positions;
means for eliminating at least one of the plurality of proposed positions using the list of candidate positions; and
means for determining a position estimate for the mobile device with respect to the user based on remaining proposed positions and associated likelihoods.

22. The mobile device of claim 21, wherein the means for eliminating at least one of the plurality of proposed positions using the list of candidate positions comprises means for eliminating any proposed position that is not included in the list of candidate positions.

23. The mobile device of claim 21, wherein the at least one motion sensor comprises at least one of accelerometers, magnetometers, and gyroscopes.

24. The mobile device of claim 21, wherein the at least one light sensor comprises at least one of an ambient light sensor, proximity sensor and camera intensity sensor.

25. The mobile device of claim 21, wherein the means for analyzing the signals from the at least one motion sensor in the mobile device to generate the plurality of proposed positions with associated likelihoods comprises:
means for extracting features from the signals from the at least one motion sensor;
means for accessing models of features; and
means for using the features and the models of features to generate likelihoods for each of the plurality of proposed positions.

26. The mobile device of claim 25, further comprising means for filtering the plurality of proposed positions with associated likelihoods over time.

27. The mobile device of claim 21, further comprising means for generating a confidence metric associated with the position estimate based on a difference of likelihoods of two most likely proposed positions after eliminating the at least one of the plurality of proposed positions using the list of candidate positions.

28. The mobile device of claim 21, further comprising means for generating likelihoods that are associated with candidate positions in the list of candidate positions, wherein the means for eliminating at least one of the plurality of proposed positions using the list of candidate positions comprises multiplying the likelihoods associated with each of the plurality of proposed positions with the likelihoods associated with the candidate positions to determine a proposed position with a highest combined likelihood level that is used as the position estimate.

29. A non-transitory computer-readable medium including program code stored thereon, comprising:
   program code to receive signals from at least one motion sensor in a mobile device;
   program code to analyze the signals from the at least one motion sensor in the mobile device to generate a plurality of proposed positions with respect to a user with associated likelihoods;
   program code to receive signals from at least one light sensor in the mobile device;
   program code to process the signals from the at least one light sensor in the mobile device to produce a list of candidate positions;
   program code to eliminate at least one of the plurality of proposed positions using the list of candidate positions; and
   program code to determine a position estimate for the mobile device with respect to the user based on remaining proposed positions and associated likelihoods.

30. The non-transitory computer-readable medium of claim 29, wherein the program code to eliminate at least one of the plurality of proposed positions using the list of candidate positions comprises program code to eliminate any proposed position that is not included in the list of candidate positions.

31. The non-transitory computer-readable medium of claim 29, wherein the program code to analyze the signals from the at least one motion sensor in the mobile device to generate the plurality of proposed positions with associated likelihoods comprises:
   program code to extract features from the signals from the at least one motion sensor;
   program code to access models of features; and
   program code to use the features and the models of features to generate likelihoods for each of the plurality of proposed positions; and
   program code to filter the plurality of proposed positions with associated likelihoods over time.

32. The non-transitory computer-readable medium of claim 29, further comprising program code to generate a confidence metric associated with the position estimate, the confidence metric being based on a difference of likelihoods of two most likely proposed positions after eliminating the at least one of the plurality of proposed positions using the list of candidate positions.

33. The non-transitory computer-readable medium of claim 29, further comprising program code to generate likelihoods that are associated with candidate positions in the list of candidate positions, wherein the program code to eliminate at least one of the plurality of proposed positions using the list of candidate positions comprises program code to multiply the likelihoods associated with each of the plurality of proposed positions with the likelihoods associated with the candidate positions to determine a proposed position with a highest combined likelihood level that is used as the position estimate.

* * * * *